Patented Jan. 13, 1948

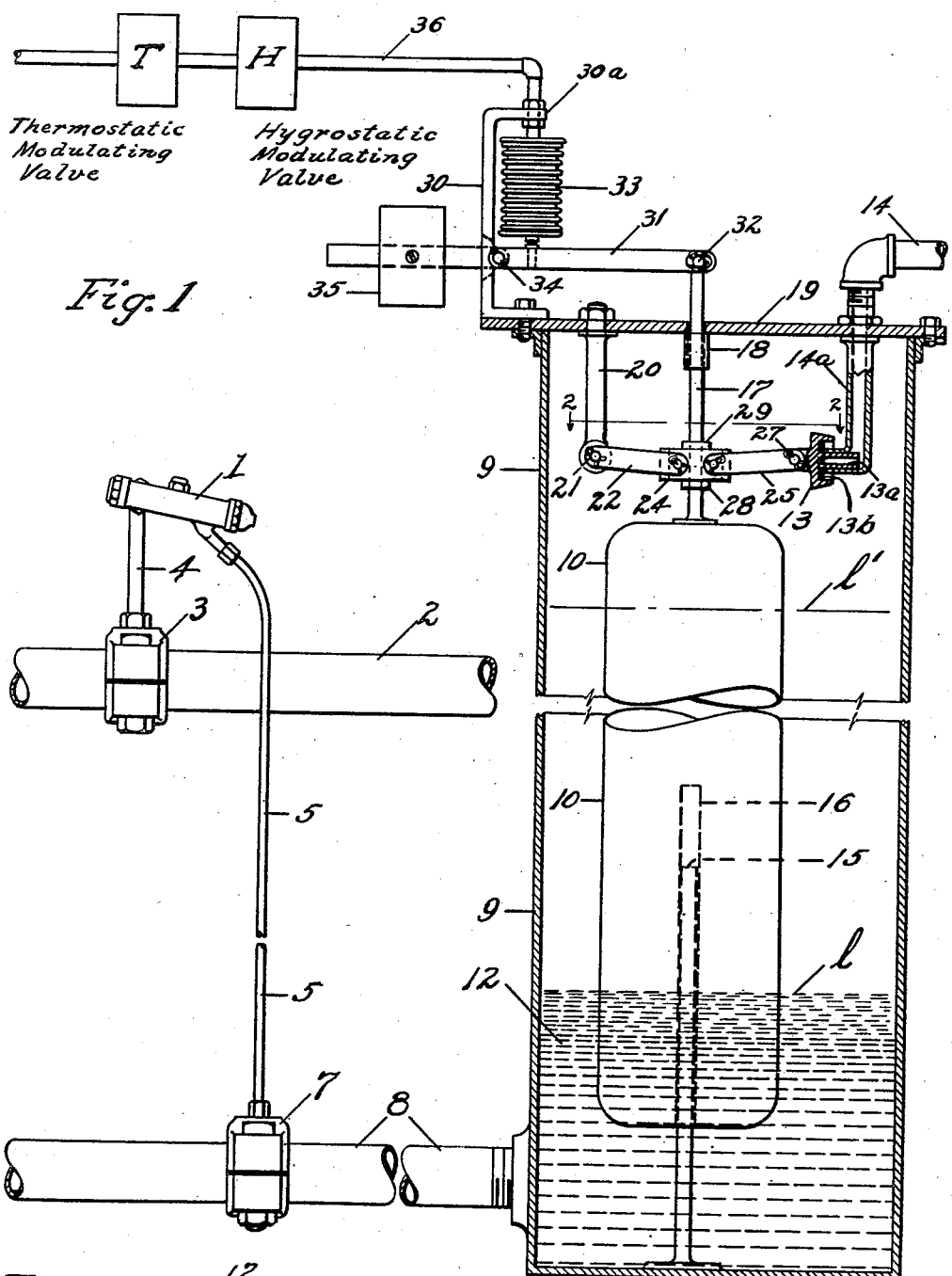

2,434,421

UNITED STATES PATENT OFFICE 2,434,421

REGULATING APPARATUS

Albert J. Loepsinger, Providence, R. I., assignor to Grinnell Corporation, Providence, R. I., a corporation of Delaware Application July 2, 1943, Serial No. 493,315

8 Claims. (Cl. 236—44)

This invention relates to improvements in regulating apparatus. More especially it has to do with apparatus for regulating the rate of discharge from an atomizer in which a fluid under pressure effects the movement of a liquid to be atomized from a level below the atomizer to the region where atomization occurs. The apparatus is intended to be used in a system employing such atomizers for the purpose of humidifying the atomsphere within an inclosure.

In designing an atomizing system for purposes of humidification the number of atomizers and their individual capacity are computed so that when all are discharging at their maximum rate their combined output will be sufficient to maintain the relative humidity of the atmosphere of an inclosure at a desired percentage even under the most unfavorable conditions likely to be encountered. For example it may be assumed that the air outside the inclosure has a dry bulb temperature of 90° and a relative humidity of 30%, and it may further be assumed that such outside air will enter the inclosure and displace the humidified air therein during working hours. Such air changes may be few in number if natural ventilation through opened windows and doors is depended upon, or may be much more frequent if a designed ventilating system with power driven fans is active. If the assumed conditions were to remain unchanged then the atomizers would discharge continuously at full capacity and put as much moisture into the room atmosphere as would be taken therefrom by the outgoing air and the goods or work in process of production. Steady operation such as this would be ideal in that the fluctuations of relative humidity would be small, the moisture discharged from the atomizers would be quickly evaporated, and no precipitation of small droplets of moisture upon machines or the work being processed would occur.

Unfortunately the conditions assumed for design purposes occur but seldom in actual practice. Those which prevail are usually more favorable to the maintenance of the desired relative humidity than the assumed conditions. As a consequence frequently less moisture is required from the atomizers than they will supply at continuous full discharge. The present practice is to operate the atomizers intermittently. This is now effected automatically by a humidity controller which completely shuts off the discharge from the atomizers when the relative humidity reaches or exceeds the upper limit of a predetermined range, and then turns the atomizers full on when the relatively humidity falls to or is below the lower limit of that range. This full-on or full-off performance of the atomizers has been necessary heretofore because no apparatus has been available, so far as I am aware, capable of regulating or modulating the rate of discharge from the atomizers. Their capacity or rate of discharge is fixed by the atomizer manufacturers for the maximum output of moisture consistent with acceptable atomization and they either discharge at this maximum rate or not at all in response to the customary humidity controllers.

There are occasions when the full-on operation of the atomizers is not desirable even if the relative humidity is below the predetermined range. After a week-end or even an over-night shut-down, the temperature of the atmosphere in a room may be so low that with the atomizers discharging at maximum rate the total moisture can not be completely evaporated before precipitation of small droplets occurs. Likewise when a number of heat-generating machines normally in use are held idle for an appreciable period. Also during the winter season when the room temperature may be unusually cool. And even after the temperature has risen to a point where it has become stabilized under conditions frequently prevailing and the relative humidity is about as wanted, discharge of the atomizers at maximum rate will cause overruns or rises of the relative humidity to percentages greater than that desired. Similarly when the atomizers are fully shut off and do not become active until the relative humidity falls to the lower limit of a desired range, the overrun of the relative humidity to percentages less than that desired is objectionable.

Accordingly it is a principal object of this invention to provide apparatus for regulating or modulating the rate of discharge of the atomizers in accordance with the conditions of the atmosphere being humidified to the end that the fluctuations in the relative humidity will be reduced and that overruns, when they occur, will be materially minimized. The rate of discharge may be regulated in accordance with changes in the temperature condition alone, or with changes in the humidity condition alone, but preferably in accordance with changes in both conditions. More particularly, having determined that the rate of discharge of an atomizer can be regulated by varying the distance through which the liquid to be atomized must be lifted to the atomizer, another object of my invention is to provide apparatus responsive to and actuated by the conditions of the atmosphere for changing the level from which the liquid must be raised.

The best mode in which I have contemplated applying the principles of my invention is shown in the accompanying drawings but these are to be deemed merely illustrative because it is intended that the patent shall cover by suitable expression in the appended claims whatever features of patentable novelty exist in the invention disclosed.

In the accompanying drawings:

Figure 1 is an elevation, partly in section, of apparatus embodying my invention; and Figure 2 is a plan view, as on line 2—2 of Figure 1, of certain details.

Referring now more particularly to the drawings, I have shown an atomizer 1 of the self-cleaning type, such as is disclosed in Letter Patent No. 2,173,072, granted on September 12, 1939. This atomizer represents several which are distributed about an inclosure and mounted on pipes 2 connected with a source of fluid under pressure, usually air, say at 20–30 pounds gauge pressure. When turned on by the action of the usual humidity controller (not shown) this air is conducted through a fitting 3 and nipple 4 to the atomizer wherein it sets up an aspirating action which lifts the liquid to be atomized, usually water, through a riser 5 from a fitting 7 on a distributing pipe 8. As this liquid reaches the outlet of the atomizer it is atomized and discharged into the atmosphere by the fluid under pressure.

The maximum discharge occurs when the liquid is lifted about four inches, which is the distance now deemed standard under present practice. I have determined, however, that acceptable atomization can be accomplished when the liquid is lifted through greater distances and that by changing the distance of lift, the rate of discharge from the atomizer can be regulated or modulated inversely as this distance is increased. Accordingly it is a feature of my invention to provide apparatus whereby the level of the liquid can be readily changed with respect to the region where atomization occurs and to control the level in accordance with conditions of the atmosphere into which the moisture is discharged for purposes of humidification.

The distributing pipe 8 is connected near the bottom of a tank 9 in which a float 10 is movable by the liquid 12 therein to open or close a valve 13 controlling an available supply of the liquid led to the tank through a supply line 14. The float is guided in its up and down movements by a guide rod 15 mounted on the bottom of the tank and extending into a tubular sleeve 16 sealed off from the chamber of the float, and by an upstanding rod 17 attached to the top of the float and passing through a suitable guide 18 in a removable cover 19 on the tank.

Secured to the cover is a depending post 20 having a bearing at its lower end to receive an axle pin 21. On the latter are pivotally mounted a pair of links 22, 23, which are also pivotally connected with one pair of trunnions on a block 24. Another pair of trunnions on the block provide pivotal bearings for another pair of links 25, 26 extending to and pivotally connected by an axle pin 27 with the valve 13. The latter, as seen in Figure 1, has a slotted stem 13a extending into the end of the liquid inlet pipe 14a and has a suitable washer 13b around the said stem to effect closure of the pipe when the valve is seated. The block 24 has an elongated slot 24a through which the float rod extends and on the latter, just above and below the block, are secured collars 28 and 29. As the latter rise or fall in accordance with movements of the float the block is simultaneously raised or lowered and caused to slide transversely between the collars, thus effecting the opening or closing of the valve 13.

Mounted on a bracket 30 on the cover 19 is a lever 31 having pivotal connection at 32 with the extending end of the float rod 17. A bellows 33 is secured to the top arm 30a of the bracket and so arranged that its movable end engages the lever at a point intermediate its fulcrum bearing at 34 and its pivotal connection 32 with the float rod. The weight of the lever and such load as may be imposed on it by the bellows, when only atmospheric pressure is in the latter, may be substantially counterbalanced by a weight 35 adjustable along the lever bar.

When so counterbalanced, the liquid in the tank 9 need rise to but a low level, indicated by the line $l$, to submerge enough of the float to cause it to stand at the position shown in Figure 1 with the water supply valve closed. The low level of the liquid thus determined is the level in the various riser pipes 5 leading to the atomizers. Assuming this low level to be in the neighborhood of eighteen inches below the atomizer, the distance of lift for the latter is greatest and hence the rate of discharge from the atomizer will be the minimum. To effect a greater rate of discharge the liquid in the tank and riser pipes must be raised to a higher level and this is accomplished by loading the float so that a greater portion of it must be submerged before it can effect closure of the supply valve 13.

The loading of the float in the apparatus shown is accomplished by introducing pressure into the bellows 33, causing it to expand downward and exert a force on the lever 31 which proportionately transmits this downwardly acting force to the float rod 17. By imposing sufficient pressure on the bellows the liquid in the tank can rise to the level indicated by the dot-and-dash line $l'$, before the float will be moved upward far enough to effect closure of the supply valve 13. The level indicated by the line $l'$ is about four inches below the atomizer and accordingly when the liquid in the riser pipes stands at this same level the rate of discharge from the atomizers will be the maximum. At any level intermediate those effecting the maximum and minimum rates of discharge respectively, the rate of discharge will be in inverse ratio to the distance between the liquid level and the atomizers. Thus by varying the liquid level the rate of discharge from the atomizer is regulated or modulated as desired.

To vary the level and hence the rate of atomizer discharge in accordance with conditions of the atmosphere being humidified, I insert in a pressure line 36 leading to the bellows 33 either a modulating thermostatic valve T, or a modulating hygrostatic valve H, or preferably, as shown in Figure 1, both such valves are inserted in series with the thermostatic valve nearer the source of the pressure. The pressure supplied through these instruments may be taken from the same source as the air supplied to the atomizers in pipe 2, but if so taken it should not be subject to the on-and-off action of the humidity controller but must available at all times. Preferably the pressure for use in the bellows need not be as great as that usually supplied to the atomizers; an adjustable reducing valve is a convenient means to obtain the pressure desired, which may be of the order of fifteen pounds.

Assume that the apparatus disclosed is so constructed and arranged that when the full pressure in the line 36 is effective on the bellows 33 the level of liquid in the float tank stands at the line l' and the maximum rate of discharge occurs. This means that both the thermostatic and hygrostatic valves are wide open. If the thermostatic valve remains wide open, then by movement of the hygrostatic valve the rate of discharge can be regulated or modulated throughout the entire range between the maximum and minimum rates of discharge. If, however, the thermostatic valve is partly closed, say to one-half open position so that approximately only a pressure of seven and one-half pounds gauge is passed on to the hygrostatic valve, then the movement of the latter valve will effect regulation of the rate of discharge between what might be called the half rate of discharge and the minimum rate of discharge. That is to say, with the thermostatic and hygrostatic valve arranged in series as shown, the former can determine the maximum amount of pressure available for use in the bellows while the hygrostatic valve can determine how much or how little of this available pressure shall be actually imposed on the bellows.

To appreciate the purpose and functions of the modulating valves in the pressure line leading to the bellows, I shall assume certain conditions of temperature and humidity for purposes of explanation. For example, assume that it is determined for the inclosure being humidified that if the temperature of the atmosphere goes below 60°, the atomizers should be limited to their minimum rate of discharge. Accordingly the thermostatic valve is adjusted so that at 60°, or any temperature below that, it will remain closed. This means that no pressure can pass the thermostatic valve and that the pressure in the bellows will be that of the atmosphere. Thus no additional load is imposed on the float and it will rise to shut off the water supply valve 13 when the water reaches the level l in the tank. If, under these conditions, the humidity controller acts to turn on the air pressure to the atomizers, the rate of discharge of the latter will be at its minimum. Obviously as this discharge occurs and the level of water in the tank starts to fall, the float will move downward slightly, open the water supply valve 13 and admit water to restore the level to that indicated at l.

If now the temperature in the room rises above 60° the thermostatic valve will be opened an amount corresponding to the rise of temperature, thus making available some air pressure to act upon the bellows. Assuming for the moment that the hygrostatic valve remains wide open, whatever pressure is passed by the now partly opened thermostatic valve will be effective in the bellows to impose some load on the float. This will cause the latter to fall and admit water to the tank until, due to the loading now imposed on the float, a level somewhat higher than that at l is reached. This higher level will result in a rate of discharge from the atomizers greater than the minimum rate of discharge.

Finally at some temperature, say about 90°, the thermostatic valve will be wide open, passing all the air pressure available (the hygrostatic valve still being assumed to be fully open) to the bellows so that the latter will be fully loaded. The liquid in the tank will accordingly be maintained at the topmost level l' and when the atomizers are in action they will discharge at the maximum rate. Should the temperature continue above the assumed degree the thermostatic valve will remain wide open, making available to the bellows all the pressure in the line 36.

Now assume that thermostatic valve is held wide open, or is not even present. I will describe the regulating action of the hygrostatic valve.

This valve responds to changes in the humidity condition of the atmosphere and can be so adjusted and set that at some percentage of relative humidity the valve will be wide open and at another such percentage will be closed tight. Accordingly, having determined the upper and lower limits of the range within which it is desired to maintain the relative humidity, the hygrostatic valve is set to close when the upper limit is reached and to be wide open when the lower limit is reached. Between these limits the valve will be in a partly open position depending upon the condition of relative humidity which pertains. As the relative humidity rises, within the range, the hygrostatic valve is moved toward closed position and vice versa as the relative humidity falls within the range. Such changes in the position of the valve affects the degree of pressure in the bellows and the loading of the float. Thus it follows that the level of the liquid and the rate of discharge from the atomizers varies inversely as the relative humidity changes within the predetermined range.

From the foregoing separate descriptions of the control actions of the thermostatic and hygrostatic valves, it is clear that if the former alone is used the rate of discharge from the atomizers will be regulated through some predetermined range of temperature, being a minimum at or below the lower limit of the temperature range and being a maximum at or above the upper limit of the temperature range. If the hygrostatic valve is alone employed the rate of discharge can be thereby regulated within a predetermined range of relative humidity, the rate being gradually reduced as the upper limit of the range is approached and being gradually increased as the relative humidity falls toward the lower limit. While the use of either valve alone will give results better than have heretofore been attained by the ordinary humidity controller, it is preferable to employ both the thermostatic and hygrostatic valves in series as shown in Figure 1.

With both valves present, and arranged as shown, the thermostatic valve determines the maximum pressure in the bellows and hence the maximum rate of discharge which can occur from the atomizers, leaving to the hygrostatic valve the function of modulating the rate of discharge between the minimum rate and such maximum rate as is determined by the thermostatic valve. More in detail the combined control action of the two valves in series would be as follows.

The thermostatic valve will be adjusted to remain closed at some temperature well below any likely to occur. Should such temperature ever be reached, there would be no air pressure available for control by the hygrostatic valve and so even if the latter should attempt its modulating action it would produce none and the atomizers would discharge at the minimum rate whenever put in action by the humidity controller. In short, regardless of the condition of relative humidity, the thermostatic valve would be in full command preventing more than the minimum rate of discharge so long as the room temperature remained below a degree where any greater rate of discharge might result in undesired precipitation of moisture.

Upon the temperature rising and causing the thermostatic value to partly open, air pressure would then be passed to the hygrostatic valve, say at about five pounds gauge for example. If the relative humidity is at or below the desired range, the hygrostatic valve will be wide open and all of the five pounds of pressure will be passed to the bellows thus imposing a corresponding load on the float. This will permit the water level to rise and give a rate of discharge somewhat higher than the minimum rate, say at about one-third of the maximum rate. As the atomizers discharge at this rate the relative humidity begins to rise and as this rise proceeds above the lower limit of the desired range, the hygrostatic valve will begin to close. This reduces the pressure effective on the bellows and consequently the load on the float, and so the liquid level in the tank will fall and the rate of discharge will decrease. This will slow down the rise of the relative humidity and cause the latter to approach its upper limit at a decelerating rate.

Indeed, by thus reducing the rate of discharge of the atomizers and decelerating the rise of relative humidity, the latter rise may be actually arrested before the upper limit of the desired range is exceeded. But even if this upper limit is reached, the rate at which the relative humidity rises will be so reduced by the action of the hygrostatic valve that the overrun will be much less than if the discharge of the atomizers had been continued at full capacity up to the upper limit and then abruptly shut off as is present practice.

Similarly as the relative humidity starts to fall, the hygrostatic valve is opened wider, more pressure is imposed on the bellows and a greater load on the float. The liquid level in the tank rises and the rate of discharge from the atomizers is increased. This increased rate of discharge decelerates the rate of fall of relative humidity and if the fall is not entirely stopped before the lower limit of the desired range is reached, the rate of fall will have been so reduced that the overrun below the lower limit is materially cut down.

While the just described modulating action of the hygrostatic valve is taking place the room temperature may change. If it rises the thermostatic valve is opened wider thus raising the maximum rate of discharge which the hygrostatic valve can effect during its modulating action. Finally if the temperature rises to or above the degree at which the thermostatic valve is maintained in its wide open position—at which temperature conditions it is to be assumed that full capacity discharge of the atomizers can occur without danger of precipitation—the hygrostatic valve will then modulate the actual rate of discharge in accordance as the relative humidity changes within the desired range. If it falls below the lower limit, the atomizers will discharge at full maximum capacity until the lower limit is restored. If the relative humidity exceeds the upper limit the rate of discharge will be at a minimum until that limit is restored. And as the relative humidity falls toward the lower limit or rises toward the upper limit the rate of discharge of the atomizers will be increased or decreased respectively, so that the overrun beyond both limits will be very materially reduced.

Under favorable conditions and with careful adjustment of the apparatus, the combined control exercised by both the thermostatic and the hygrostatic valves may result in continuous operation of the atomizers and the actual maintenance of the relative humidity within the limits of the desired range. This ideal condition, however, is not the only benefit gained by the practical application of my improvements, because in any event the atomizers will be active for much longer periods and at a capacity more nearly commensurate with the desired relative humidity than is now possible with the present practice of full capacity discharge whenever the atomizers are in operation. Such longer periods of discharge, with the rate of discharge varied in keeping with the demand, promotes more steady humidity conditions, avoids precipitation regardless of temperature, and minimizes undesirable overruns beyond both limits of the desired range of relative humidity.

Although I have assumed certain conditions for the purpose of explaining the regulating action of my apparatus, the scope of the invention is not restricted to the arrangement and adjustment of the instruments as described. The thermostatic valve may be set to begin its modulating action at any temperature that experience or trial indicate to be proper. This temperature might be lower than any likely to be encountered or may be considerably above, as in inclosures where conditions normally prevail which permit the minimum rate of discharge through a considerable period of low temperature operation. Such is most likely to occur when the relative humidity is to be maintained at a low percentage and the occasions of very low temperature are short and infrequent.

The hygrostatic valve might be of the reversed type from that described, that is, one which can be set to effect the minimum rate of discharge at the lower limit of the desired range, with increasing rates of discharge as the upper limit is approached.

Under certain conditions the hygrostatic valve may be used alone for control purposes and the usual humidity controller can be omitted from the system. This, of course, presupposes a gradient of modulation steep enough to prevent overhumidification. That is to say, the maximum distance of lift of the liquid to the atomizers should be so great that the corresponding minimum discharge would be insufficient under any conditions to cause the relative humidity to rise beyond the upper limit of the desired range. Ordinarily, as hereinbefore stated, when the usual humidity controller is used satisfactory modulation of discharge can be enjoyed when the distance of the lift of the liquid varies from four to eighteen inches. But if the full-on and full-off controller is omitted, then the greatest distance of lift should be about doubled, that is, of the order of about thirty-six inches, the actual distance depending upon the aspirating ability of the atomizers used. Such an increase in distance of lift could be easily arranged by increasing the depth of the tank, the length of the float and the size of the bellows. With this arrangement, as the relative humidity falls the hygrostatic valve would open to pass more pressure to the bellows, thus loading the float, raising the liquid level and increasing the rate of discharge from the atomizers. Conversely as the relative humidity approached the upper limit of the desired range the hygrostatic valve would reduce the pressure in the bellows and thus bring about a reduced rate of discharge from the humidifiers.

I claim:

1. Apparatus for regulating the rate of discharge from an atomizer, in which a fluid under pressure effects the movement of the liquid to be atomized from a level below the atomizer to the region where atomization occurs, comprising means responsive to variations in the condition of the atmosphere, into which the atomized liquid is discharged, for modulating the said level of the liquid in proportion to the said variations of the controlling conditions.

2. Apparatus for regulating the rate of discharge from an atomizer, in which a fluid under pressure effects the movement of the liquid to be atomized from a level below the atomizer to the region where atomization occurs, comprising means responsive to variations in the temperature of the atmosphere, into which the atomized liquid is discharged, for modulating the said level of the liquid in proportion to the said variations of temperature.

3. Apparatus for regulating the rate of discharge from an atomizer, in which a fluid under pressure effects the movement of the liquid to be atomized from a level below the atomizer to the region where atomization occurs, comprising means responsive to variations in the humidity condition of the atmosphere, into which the atomized liquid is discharged, for modulating the said level of liquid in proportion to the said variations of the humidity condition.

4. Apparatus for regulating the rate of discharge from an atomizer, in which a fluid under pressure effects the movement of the liquid to be atomized from a level below the atomizer to the region where atomization occurs, comprising means responsive to the temperature and humidity conditions of the atmosphere into which the atomized liquid is discharged, for controlling the said level in predetermined relation to the said temperature and humidity conditions.

5. Apparatus for regulating the rate of discharge from an atomizer, in which a fluid under pressure effects the movement of the liquid to be atomized from a level below the atomizer to the region where atomization occurs, comprising means responsive to the temperature condition of the atmosphere into which the atomized liquid is discharged for controlling the said level to fix limits of the rate of discharge from the atomizer, and means responsive to the humidity condition of the said atmosphere for controlling said level to regulate the rate of discharge between the said fixed limits.

6. Apparatus for regulating the rate of discharge from an atomizer, in which a fluid under pressure effects the movement of the liquid to be atomized from a level below the atomizer to the region where atomization occurs, comprising a supply system for the liquid, means controlling the supply, means responsive to changes in the level of said liquid for actuating said supply controlling means, and means responsive to variations in a condition of the atmosphere, into which the atomized liquid is discharged, for modulating the said level of liquid in proportion to the said variations of the controlling condition.

7. Apparatus for regulating the rate of discharge from an atomizer, in which a fluid under pressure effects the movement of the liquid to be atomized from a level below the atomizer to the region where atomization occurs, comprising a supply system for the liquid, means including a float responsive to changes in the said level for controlling the supply to restore a predetermined level, and means for changing the effective weight of said float to thereby vary the said level with respect to said region of atomization.

8. Apparatus for regulating the rate of discharge from an atomizer, in which a fluid under pressure effects the movement of the liquid to be atomized from a level below the atomizer to the region where atomization occurs, comprising means for varying the level of said liquid, means responsive to variations in the temperature of the atmosphere, into which the atomized liquid is discharged, for controlling the said level varying means to determine the maximum and minimum rates of discharge, and means responsive to variations in the humidity condition of the said atmosphere for controlling the said level varying means to vary the rate of discharge between said maximum and minimum rates in accordance with the said variations in the humidity condition.

ALBERT J. LOEPSINGER.

REFERENCES CITED

The following references are of record in the file of this patent:

UNITED STATES PATENTS

| Number | Name | Date |
|---|---|---|
| 1,270,159 | Hodge | June 18, 1918 |
| 1,858,779 | Ireland | May 17, 1932 |
| 1,336,288 | Elliott | Apr. 6, 1920 |
| 1,788,251 | Rosenow | Jan. 6, 1931 |
| 1,291,946 | Lindmeier | Jan. 21, 1919 |

Certificate of Correction

Patent No. 2,434,421. January 13, 1948.

ALBERT J. LOEPSINGER

It is hereby certified that error appears in the printed specification of the above numbered patent requiring correction as follows: Column 10, list of references cited, under the heading "UNITED STATES PATENTS" add the following:

| | | |
|---|---|---|
| 1,675,302 | Roemer | June 26, 1928 |
| 1,858,725 | Armstrong | May 17, 1932 | and that the said Letters Patent should be read with this correction therein that the same may conform to the record of the case in the Patent Office.

Signed and sealed this 30th day of March, A. D. 1948.

[SEAL]

THOMAS F. MURPHY,
*Assistant Commissioner of Patents.*